United States Patent
Morita et al.

(10) Patent No.: US 11,155,224 B2
(45) Date of Patent: Oct. 26, 2021

(54) BUMPER REINFORCEMENT FOR AUTOMOBILE

(71) Applicant: Kobe Steel, Ltd., Kobe (JP)

(72) Inventors: Shinya Morita, Shimonoseki (JP); Narikazu Hashimoto, Shimonoseki (JP); Tsunetake Tsuyoshi, Shimonoseki (JP); Koji Tabata, Shimonoseki (JP)

(73) Assignee: Kobe Steel, Ltd., Kobe (JP)

( * ) Notice: Subject to any disclaimer, the term of this patent is extended or adjusted under 35 U.S.C. 154(b) by 105 days.

(21) Appl. No.: 16/788,368

(22) Filed: Feb. 12, 2020

(65) Prior Publication Data
US 2020/0282932 A1   Sep. 10, 2020

(30) Foreign Application Priority Data
Mar. 8, 2019   (JP) .............................. JP2019-042975

(51) Int. Cl.
*B60J 7/00* (2006.01)
*B60R 19/18* (2006.01)
*B60R 19/02* (2006.01)

(52) U.S. Cl.
CPC ............ *B60R 19/18* (2013.01); *B60R 19/023* (2013.01); *B60R 2019/182* (2013.01); *B60R 2019/186* (2013.01)

(58) Field of Classification Search
CPC . B60R 19/18; B60R 19/34; B60R 2019/1813; B60R 2019/182; B60R 19/24; B62D 25/025
See application file for complete search history.

(56) References Cited

U.S. PATENT DOCUMENTS

| | | | | |
|---|---|---|---|---|
| 4,826,226 A | * | 5/1989 | Klie | B60R 19/22 293/120 |
| 5,340,178 A | * | 8/1994 | Stewart | B60R 19/18 293/122 |
| 6,209,934 B1 | * | 4/2001 | Sakuma | B60R 19/18 293/120 |
| 6,746,061 B1 | * | 6/2004 | Evans | B60R 19/18 293/120 |

(Continued)

FOREIGN PATENT DOCUMENTS

| | | |
|---|---|---|
| JP | 7-81504 A | 3/1995 |
| JP | 2013-103556 A | 5/2013 |

(Continued)

*Primary Examiner* — Kiran B Patel
(74) *Attorney, Agent, or Firm* — Oblon, McClelland, Maier & Neustadt, L.L.P.

(57) ABSTRACT

To compensate for a decrease in reaction force of a bumper reinforcement, which is made of an aluminum alloy extrusion having two end portions subjected to bend forming and crushed portions on the respective end portions, against an impact load in end impact involved in crushing, and compensate for a decrease in energy absorption amount of the bumper reinforcement. Assuming a space between two flanges includes a first region from a center line of the thickness between the flanges to an outer flange and a second region from the center line to an inner flange in a cross section of the crushed portion perpendicular to an extrusion direction, area of the webs located in one (for example, the first region) of the two regions is larger than area of the webs located in the other region (for example, the second region).

3 Claims, 3 Drawing Sheets

(56) References Cited

U.S. PATENT DOCUMENTS

| | | | |
|---|---|---|---|
| 2010/0201139 A1* | 8/2010 | Hashimura | B60R 19/18 293/133 |
| 2010/0230981 A1* | 9/2010 | Hock | B60R 19/18 293/132 |
| 2011/0204663 A1* | 8/2011 | Baccouche | B60R 19/18 293/102 |
| 2012/0228889 A1* | 9/2012 | Haneda | B60R 19/18 293/132 |
| 2014/0091584 A1* | 4/2014 | McConnell | B60R 19/18 293/120 |
| 2015/0069772 A1 | 3/2015 | Hashimoto et al. | |
| 2015/0307045 A1* | 10/2015 | Matecki | B60R 19/18 293/122 |
| 2016/0101753 A1* | 4/2016 | Higashimachi | B60R 21/0136 293/117 |
| 2016/0114747 A1* | 4/2016 | Ishitobi | B60R 19/18 293/120 |
| 2016/0167609 A1* | 6/2016 | Corwin | B60R 19/18 293/120 |
| 2016/0207482 A1* | 7/2016 | Tachibana | B60R 19/18 |
| 2016/0280163 A1* | 9/2016 | Matecki | E04C 3/06 |
| 2016/0347270 A1* | 12/2016 | Higashimachi | B60R 19/48 |
| 2017/0043735 A1* | 2/2017 | Yamaguchi | B60R 19/483 |
| 2017/0144619 A1* | 5/2017 | Shamoto | B60R 19/023 |
| 2018/0037179 A1* | 2/2018 | Steinebach | B23K 31/02 |
| 2018/0056352 A1* | 3/2018 | Weykamp | C22F 1/04 |
| 2018/0162302 A1* | 6/2018 | Kitakata | B60R 19/18 |
| 2018/0208138 A1* | 7/2018 | Wakabayashi | G01L 5/00 |
| 2018/0257586 A1* | 9/2018 | Kitakata | B60R 19/03 |
| 2018/0257589 A1* | 9/2018 | Kawamura | B60R 19/24 |
| 2018/0361968 A1* | 12/2018 | Yatsunami | B60R 19/023 |
| 2018/0370469 A1* | 12/2018 | Shibata | B60R 19/18 |
| 2019/0084512 A1* | 3/2019 | Takayanagi | B60R 19/22 |
| 2019/0256023 A1* | 8/2019 | Tashiro | B60R 19/34 |
| 2019/0270421 A1* | 9/2019 | Tashiro | B60R 19/24 |
| 2020/0031087 A1* | 1/2020 | Miura | B32B 3/12 |
| 2020/0086815 A1* | 3/2020 | Koga | B60R 19/18 |
| 2020/0139910 A1* | 5/2020 | Maeda | B60R 19/03 |
| 2020/0339052 A1* | 10/2020 | Rebstock | B21D 28/26 |
| 2020/0353987 A1* | 11/2020 | Yoshida | B62D 21/152 |
| 2020/0353993 A1* | 11/2020 | Yoshida | B60R 19/02 |
| 2021/0024022 A1* | 1/2021 | Matecki | B60R 19/12 |
| 2021/0039574 A1* | 2/2021 | Unal | B60R 19/02 |
| 2021/0094495 A1* | 4/2021 | Park | B60R 21/0136 |

FOREIGN PATENT DOCUMENTS

| | | |
|---|---|---|
| JP | 2015-051755 A | 3/2015 |
| JP | 2015-168299 A | 9/2015 |

* cited by examiner

BUMPER REINFORCEMENT FOR AUTOMOBILE

BACKGROUND

The present invention relates to an automotive bumper reinforcement including an aluminum alloy extrusion having a closed section structure.

A bumper reinforcement including an aluminum alloy extrusion typically includes a pair of flanges (an inner flange located on an inner side (body side) and an outer flange located on an outer side (impact side) in a body longitudinal direction) and a plurality of webs connecting the flanges together. The bumper reinforcement has a closed section structure given by such flanges and webs.

The bumper reinforcement including the aluminum alloy extrusion has two end portions that are each bent toward the body from the request in automotive design or from the requirement of having a certain impact resistance to oblique impact.

The bumper reinforcement having the two end portions bent toward the body has a crushed portion as required on each of the two end portions, for example, as described in Japanese Unexamined Patent Application Publication Nos. 2013-103556 and 2015-168299. The crushed portion has been subjected to crushing in a direction perpendicular to the flanges, and thus, as shown in FIGS. 2A to 2C, has a thickness smaller than an original thickness between the flanges, and has the webs bending-deformed and thus curved between the flanges. The crushed portion has a reduced section modulus due to the decreased thickness between the flanges.

As described in Japanese Unexamined Patent Application Publication No. 2015-51755, the reduction in section modulus and the bending deformation of each web cause a decrease in reaction force against an impact load in end impact and a decrease in energy absorption amount of the bumper reinforcement.

SUMMARY

An object of the invention is to compensate for a decrease in reaction force of a bumper reinforcement, which is made of an aluminum alloy extrusion having two end portions subjected to bend forming and crushed portions on the respective end portions, against an impact load in end impact, and compensate for a resultant decrease in energy absorption amount of the bumper reinforcement.

The invention relates to an improvement in bumper reinforcement including an aluminum alloy hollow extrusion having a closed section structure and configured of an outer flange, an inner flange, and a plurality of webs connecting the flanges together, the aluminum alloy hollow extrusion having two end portions bent toward a body and having a crushed portion in each end portion so as to have a smaller thickness than an original thickness between the flanges and allow the webs to be bending-deformed between the flanges, where assuming a space between the flanges includes a region from a center line of the thickness between the flanges to the outer flange and a region from the center line to the inner flange in a cross section of the crushed portion perpendicular to an extrusion direction, area of the webs located in one of the two regions is larger than area of the webs located in the other region.

In existing bumper reinforcements, the webs exist between the flanges in the crushed portion evenly between the two regions, i.e., the web in one of the two regions has area equal to area of the web in the other. On the other hand, in the bumper reinforcement of the invention, the webs exist between the flanges in the crushed portion unevenly between the two regions, i.e., the web in one of the two regions has area larger than area of the web in the other. In the bumper reinforcement of the invention, therefore, the number of supporting points of the webs supporting the flange in the one region increases in end impact, making it possible to compensate for a decrease in reaction force against an impact load and a resultant decrease in energy absorption amount of the bumper reinforcement.

DETAILED DESCRIPTION

First, a bumper reinforcement 1 of an existing example is described with reference to FIGS. 2A, 2B, and 2C.

Figure 2A:
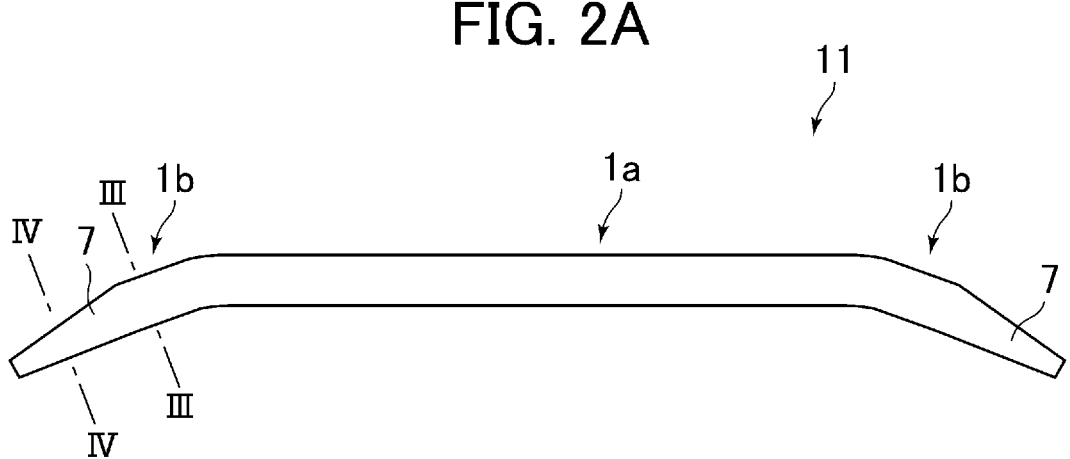
FIG. 2A is a plan view illustrating a bumper reinforcement of an existing example.
Figure 2B:
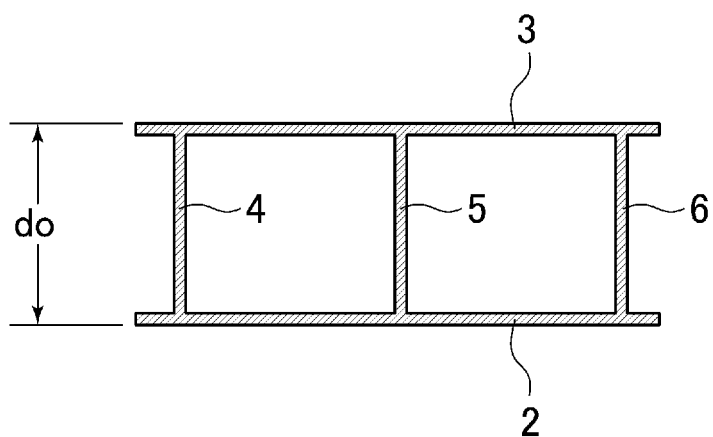
FIG. 2B is a sectional view along a line of FIG. 2A.
Figure 2C:
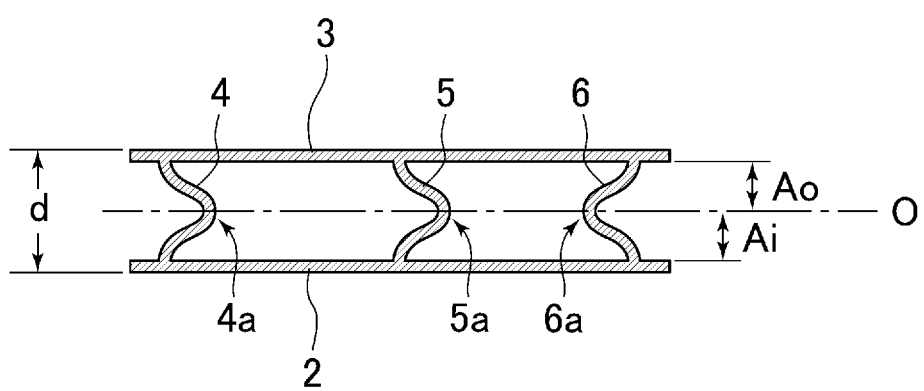
FIG. 2C is a sectional view along a line IV-IV of FIG. 2A.

The bumper reinforcement 1 of FIG. 2A includes an aluminum alloy extrusion having a closed section structure as a raw material. As shown in FIG. 2B, the closed section structure includes a pair of flanges (inner flange 2 and outer flange 3) located with a distance on a body side and an impact side, respectively, and a plurality of (three in this example) webs 4 to 6 located with a distance in a body vertical direction and connecting the flanges 2 and 3 together. In the cross section shown in FIG. 2B, the flanges 2 and 3 and the webs 4 to 6 each have a plate-like shape (having a uniform thickness except for a connection having a fillet) and are roughly perpendicular to each other.

In the bumper reinforcement 1, a central portion 1a is parallel to a body width direction, and each of two end portions 1b and 1b is bent toward the body, and part of the end portion is subjected to crushing from the outer flange 3 toward the inner flange 2. In a crushed portion (crushed portion 7), thickness d (thickness between outer surfaces of the flanges 2 and 3) is smaller than an original thickness $d_0$ ($d<d_0$), and the webs 4 to 6 are each bending-deformed and curved between the flanges 2 and 3. In this example, the crushed portion 7 has a larger crushing amount (crushing level) but a smaller thickness d at a point closer to an end of the bumper reinforcement 1.

A cross section (FIG. 2C) of the crushed portion 7 perpendicular to an extrusion direction shows that the webs 4 to 6 are bending-deformed symmetrically with respect to the center line O of the thickness between the flanges 2 and 3, and bending tops 4a, 5a, and 6a are located on the center line O. In other words, assuming the space between the flanges 2 and 3 includes a region Ai from the thickness center line O to the inner flange 2 and a region Ao from the center line O to the outer flange 3, the total area of the webs 4 to 6 includes a first area in the region Ai and a second area in the region Ao while the first area is equal to the second area. It could be said that the center of gravity of the webs 4 to 6 is located on the center line O. The "extrusion direction" of "cross section of the crushed portion 7 perpendicular to an extrusion direction" means an extrusion direction before crushing (in this example, longitudinal direction of the inner flange 2).

Figure 1A:
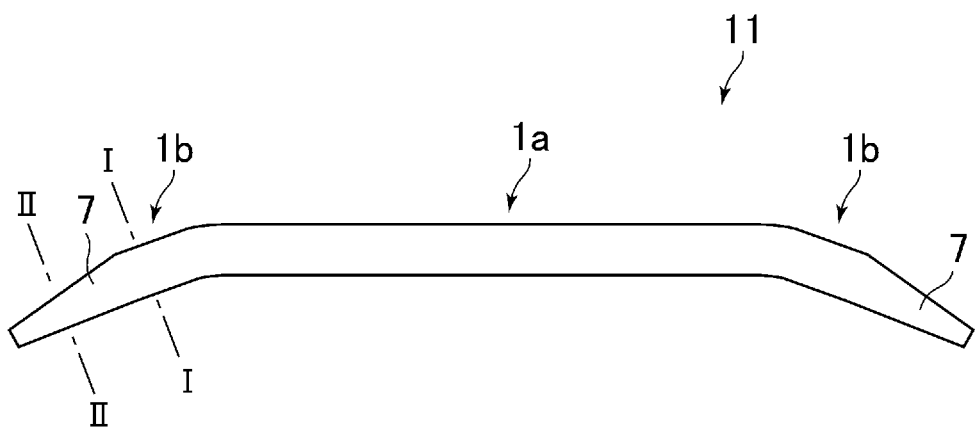
FIG. 1A is a plan view illustrating one embodiment of a bumper reinforcement of the invention.
Figure 1B:
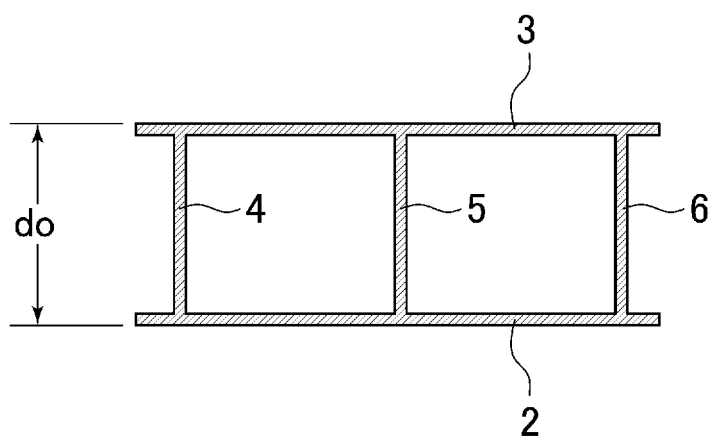
FIG. 1B is a sectional view along a line I-I of FIG. 1A.
Figure 1C:
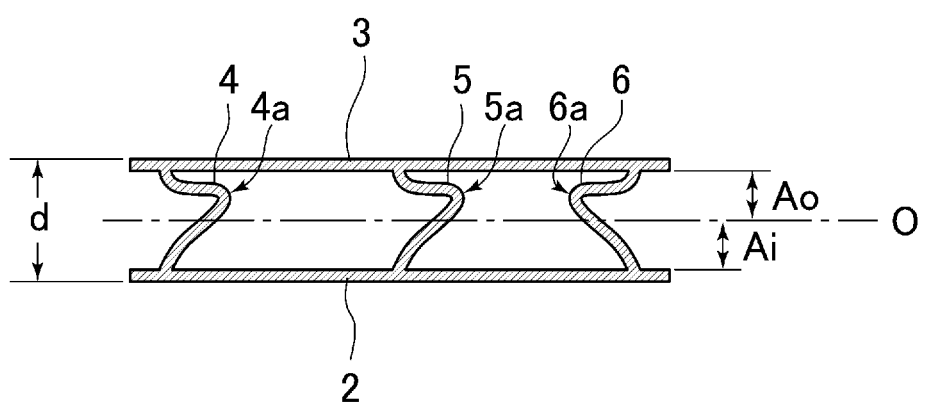
FIG. 1C is a sectional view along a line II-II of FIG. 1A.

Subsequently, a bumper reinforcement 11 of the invention is described with reference to FIGS. 1A, 1B, and 1C. In FIGS. 1A, 1B, and 1C, signs and numbers of respective portions of the bumper reinforcement 11 are the same as those in FIGS. 2A, 2B, and 2C.

The bumper reinforcement 11 includes an aluminum alloy extrusion having the same sectional shape as that of the bumper reinforcement 1, and as with the bumper reinforcement 1, the central portion 1a is parallel to a body width direction, and the two end portions 1b and 1b are bent toward the body, and part of the end portion 1b is subjected to crushing. In a crushed portion (crushed portion 7) of the bumper reinforcement 11, thickness d of the bumper reinforcement 11 is smaller than an original thickness $d_0$ ($d<d_0$), and the webs 4 to 6 are each bending-deformed and curved between the flanges 2 and 3. In the bumper reinforcement 11, as with the bumper reinforcement 1, the crushed portion 7 has a larger crushing amount (crushing level) but a smaller thickness d at a point closer to an end of the bumper reinforcement 11.

The difference between the bumper reinforcement 11 and the bumper reinforcement 1 is clearly shown in a cross section (FIG. 1C) of the crushed portion 7 perpendicular to the exclusion direction. In the crushed portion 7 of the bumper reinforcement 11, the webs 4 to 6 are bending-deformed asymmetrically (biased toward the outer flange 3) with respect to the center line O of the thickness between the flanges 2 and 3, and bending tops 4a, 5a, and 6a are each located closer to the outer flange 3 (within a region Ao as describe later) than the center line O. In other words, assuming the space between the flanges 2 and 3 includes a region Ai from the thickness center line O to the inner flange 2 and a region Ao from the center line O to the outer flange 3, the total area of the webs 4 to 6 includes a first area in the region Ai and a second area in the region Ao while the first area is larger than the second area. It could be said that the center of gravity of the webs 4 to 6 is located closer to the outer flange 3 than the center line O. As in the previous example, the "extrusion direction" of "cross section of the crushed portion 7 perpendicular to an extrusion direction" means an extrusion direction before crushing (in this example, longitudinal direction of the inner flange 2).

Deformation forms of the webs 4 to 6 as shown in FIG. 1C are given when bending in crushing starts from a point (bending center) closer to the outer flange 3 than the center of thickness between the flanges 2 and 3. As a specific possible measure to achieve this, for example, a recess is beforehand formed at a position close to the outer flange 3 in a cross section of each of the webs 4 to 6, or an initial imperfection is introduced in each of the webs 4 to 6 before crushing. As shown in FIG. 1C, the bending center of the web 4 or 6 on either end preferably faces the inside of the cross section.

Figure 3:
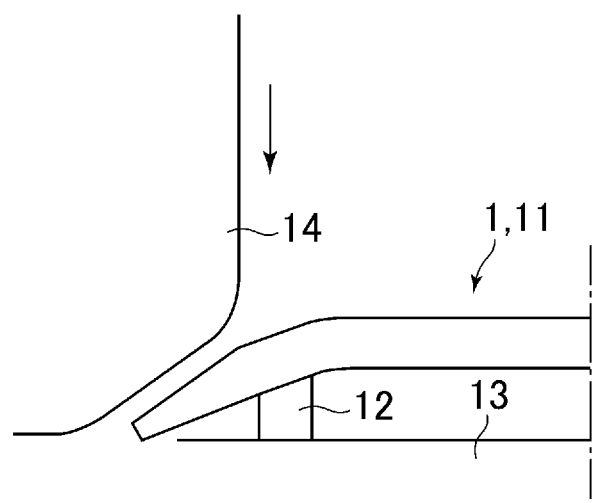
FIG. 3 is an explanatory view (major-part plan view) of end imp act.

If end impact occurs on the bumper reinforcement 11 as shown in FIG. 3, the crushed portion 7 is deformed. In FIG. 3, 12 denotes a bumper stay, 13 denotes a body frame, and 14 denotes a barrier. In the end impact, the crushed portion 7 is bent and crushed so that the thickness d is reduced, and thus the webs 4 to 6 are further significantly deformed (curved). During such deformation of the webs 4 to 6, the vicinities of the tops 4a, 5a, and 6a of the webs come into contact with the inner surface of the outer flange 3 (see FIG. 4), which increases, from 3 to 6, the number of supporting points of the webs 4 to 6 to support the outer flange 3. For the bumper reinforcement 1, since the webs 4 to 6 are bending-deformed symmetrically with respect to the center line O, even if the webs 4 to 6 are further deformed, the phenomenon of the increase in supporting points of the webs 4 to 6 is less likely to occur compared with for the bumper reinforcement 11. For the bumper reinforcement 11, the number of supporting points of the webs 4 to 6 to support the outer flange 3 thus increases in a relatively early stage of end impact, which increases bending strength of the outer flange 3, reaction force against an impact load, and energy absorption amount.

In the bumper reinforcement 11, although area of the web 4 to 6 is larger in the region Ao than in the region Ai (the center of gravity of the webs 4 to 6 is located closer to the outer flange 3 than the center line O) in the crushed portion 7 so that bending tops 4a, 5a, and 6a are located within the region Ao, this may be reversed. That is, the area of the webs may be larger in the region Ai than in the region Ao (the center of gravity of the webs may be located closer to the inner flange than the center line O) so that the bending tops are located within the region Ai. In such a case, the number of supporting points of the webs to support the inner flange 2 increases from 3 to 6 during deformation of the webs in end impact. Although the bumper reinforcement 11 has three webs 4 to 6, it may have only two (a pair of) webs at both ends.

Figure 4:
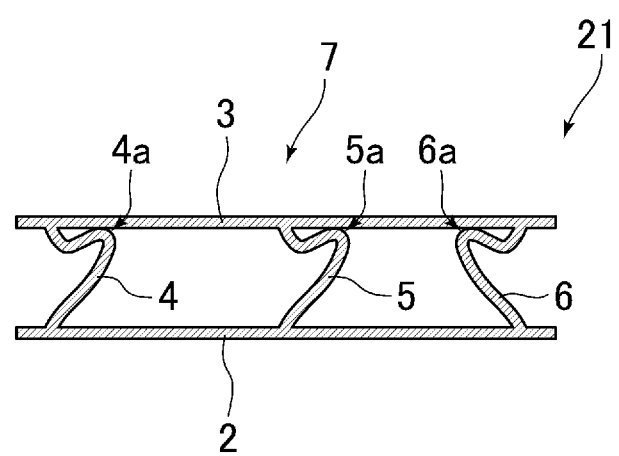
FIG. 4 is a sectional view illustrating another embodiment of the bumper reinforcement of the invention.

Another bumper reinforcement 21 of the invention is now described with reference to FIG. 4. FIG. 4 illustrates a cross section of the bumper reinforcement 21 perpendicular to an extrusion direction. The "extrusion direction" described herein means an extrusion direction before crushing (in this example, longitudinal direction of the inner flange 2) as in the previous examples. Signs and numbers of respective portions of the bumper reinforcement 21 are the same as those in FIGS. 1A to 1C. For the bumper reinforcement 21, the curved tops 4a, 5a, and 6a of the webs 4 to 6 are in contact with the inner surface of the outer flange 3 from the first (from before end impact) in a partial region (region having a relatively large crushing amount) of the crushed portion 7. The bumper reinforcement 21 is different from the bumper reinforcement 11 only in this point. The increase from 3 to 6 in the number of supporting points of the webs 4 to 6 to support the outer flange 3 increases bending strength of the outer flange 3, reaction force against an impact load, and the energy absorption amount.

This application claims the benefits of priority to Japanese Patent Application No. 2019-042975, filed Mar. 8, 2019. The entire contents of the above application are herein incorporated by reference.

What is claimed is:
1. An automotive bumper reinforcement, comprising an aluminum alloy hollow extrusion having a closed section structure and configured of an outer flange, an inner flange, and a plurality of webs connecting the flanges together,
the aluminum alloy hollow extrusion having two end portions bent toward a body and having a crushed portion in each of the end portions so as to have a smaller thickness than an original thickness between the flanges,
wherein assuming a space between the flanges includes a region from a center line of the thickness between the flanges to the outer flange and a region from the center line to the inner flange in a cross section of the crushed portion perpendicular to an extrusion direction, area of the webs located in one of the two regions is larger than area of the webs located in the other region.

2. The automotive bumper reinforcement according to claim 1, wherein area of the webs located in the region from the center line to the outer flange is larger than area of the webs located in the region from the center line to the inner flange.

3. The automotive bumper reinforcement according to claim 2, wherein each web is in contact with the outer flange in part of the crushed portion.

* * * * *